(12) United States Patent
Deshkar et al.

(10) Patent No.: US 8,468,181 B2
(45) Date of Patent: Jun. 18, 2013

(54) DISTRIBUTED METADATA CACHE

(75) Inventors: Shekhar S. Deshkar, Pune (IN);
Abhijeet P. Gole, Cupertino, CA (US);
Premkumar Mahadev Nikam,
Sunnyvale, CA (US)

(73) Assignee: Marvell World Trade Ltd. (BB)

( * ) Notice: Subject to any disclaimer, the term of this patent is extended or adjusted under 35 U.S.C. 154(b) by 65 days.

(21) Appl. No.: 13/038,696

(22) Filed: Mar. 2, 2011

(65) Prior Publication Data

US 2012/0066276 A1    Mar. 15, 2012

Related U.S. Application Data

(60) Provisional application No. 61/382,411, filed on Sep. 13, 2010.

(51) Int. Cl.
*G06F 17/30* (2006.01)
(52) U.S. Cl.
CPC ................................ *G06F 17/30017* (2013.01)
USPC .......................................... 707/827; 709/203
(58) Field of Classification Search
USPC ................. 707/792, 821, 822, 823, 825, 826, 707/827; 709/203
See application file for complete search history.

(56) References Cited

U.S. PATENT DOCUMENTS

| | | | |
|---|---|---|---|
| 8,041,735 B1* | 10/2011 | Lacapra et al. | 707/783 |
| 2004/0111441 A1* | 6/2004 | Saito et al. | 707/200 |
| 2005/0015460 A1* | 1/2005 | Gole et al. | 709/213 |
| 2007/0195796 A1 | 8/2007 | Ushiyama et al. | |

FOREIGN PATENT DOCUMENTS

EP    1 811 402 A1    7/2007

OTHER PUBLICATIONS

Mats Gustafsson et al., Using NFS to Implement Role-Based Access Control, 1997, IEEE, 299-304.*
Yu et al., An Intelligent Metadata Management System, 2009, IEEE, 22-26.*
Patent Cooperation Treaty (PCT) International Search Report and Written Opinion in co-pending PCT International Application No. PCT/US2011/026808 having an International Filing Date of Mar. 2, 2011, with a date of mailing of Jun. 29, 2011 (10 pgs).

* cited by examiner

*Primary Examiner* — Jean B Fleurantin

(57) ABSTRACT

Apparatuses, methods, and other embodiments associated with distributed metadata caching are described. According to one embodiment, a method includes intercepting a metadata request intended for an NFS server and communicating with a member of the set of peers to satisfy the metadata request from a distributed metadata cache maintained by the set of peers. The metadata request will have originated from a member of a set of peers participating in peer-to-peer distributed metadata caching.

15 Claims, 6 Drawing Sheets

DISTRIBUTED METADATA CACHE

CROSS REFERENCE TO RELATED APPLICATIONS

This application claims the benefit of U.S. provisional application Ser. No. 61/382,411 filed on Sep. 13, 2010, which is hereby wholly incorporated by reference.

BACKGROUND

A conventional network file system (NFS) architecture includes an NFS server and one or more NFS clients. The NFS clients may store data and/or metadata in memory and/or in a solid state device (SSD). The NFS server is a central repository for both files and metadata. The metadata may be, for example, information about the files including but not limited to, a file access time, a file owner, a file update time, and file permissions. An NFS client may acquire a file from the NFS server and may store a local copy of the file and its metadata in the NFS client memory. An application may then use the local copy of the file and its metadata instead of having to work across the network on the copy of the file stored at the NFS server. If there was only one NFS client and only one file and only one application working on the file then storing the local copy of the file and the local copy of the metadata might not produce significant issues.

However, an NFS server may interact with many NFS clients that want to store a local copy of a file and its metadata. Then, many applications on an NFS client may want to interact with the local copy of the file and its metadata. With multiple clients storing multiple local copies that are operated on by multiple applications it is easy to imagine how a cache coherency problem could arise where metadata got out-of-date at the NFS server and/or at an NFS client. For example, two applications on two different NFS clients could do two different things to their respective local copies of the file and to its metadata at substantially the same time.

Conventionally, NFS has handled this issue by centralizing file and metadata control, by forcing NFS clients to communicate metadata impacting actions to the NFS server, and by forcing NFS clients to "retire" metadata periodically (e.g., every 30 seconds). After metadata is retired, an NFS client may ask the NFS server for a new copy of the metadata. If there are a small number of NFS clients asking for fresh copies then this retire/refresh protocol may not be too burdensome. However, when the number of NFS clients grows too large, the centralized metadata control procedure and the retire/refresh protocol can cause the NFS server to become a bottleneck. Also, if the file and/or metadata is only being touched by the one NFS client, then the retire/refresh protocol may be unnecessary.

FIG. 1 illustrates a conventional NFS client/server environment. A first application 110 uses an NFS client 112 to communicate with an NFS server 130. Similarly, a second application 120 uses a second, different NFS client 122 to communicate with the NFS server 130. The first application 110 and the first NFS client 112 may run on a first computer while the second application 120 and the second NFS client 122 may run on a second computer. The first application 110 and the first NFS client 112 may interact with local files 118 and local metadata 119 that are stored in memory 114. Similarly, the second application 120 and the second NFS client 122 may interact with local files 128 and local metadata 129 that are stored in memory 124.

In this conventional environment, metadata control is centralized in NFS server 130. Metadata requests flow to and through NFS server 130. There is no peer-to-peer communication between the NFS client 112 and the NFS client 122 concerning metadata. When the number of applications and/or NFS clients grows beyond a certain limit, the NFS server 130 may unnecessarily become a bottleneck.

SUMMARY

In one embodiment an apparatus configured to operate in a distributed peer-to-peer metadata cache environment includes a processor, a memory, a set of logics, and an interface to connect the processor, the memory, and the set of logics. The set of logics includes a first logic configured to store metadata associated with a local copy of a file, a second logic configured to store data that facilitates storing the most up-to-date metadata for the local copy of the file in the peer-to-peer metadata cache environment, a third logic configured to store data that facilitates locating, in the peer-to-peer metadata cache environment, the most up-to-date metadata for the local copy of the file, and a fourth logic configured to acquire the most up-to-date metadata for the local copy of the file.

In one embodiment, the data stored by the second logic to facilitate storing the most up-to-date metadata for the local copy of the file in the peer-to-peer metadata cache environment comprises data that identifies a member of the peer-to-peer metadata cache environment that is responsible for one or more of, knowing which member of the peer-to-peer metadata cache environment has the most up-to-date metadata for the local copy of the file, and storing a copy of the most up-to-date metadata for the local copy of the file.

In one embodiment, the third logic is configured to identify the member of the peer-to-peer metadata cache environment that has the most up-to-date metadata for the local copy of the file by accessing a per file data structure that stores information correlating files to clients, where the per file data structure stores a file identifier and a related client identifier, where the related client identifier uniquely identifies the member of the peer-to-peer metadata cache environment that has the most up-to-date metadata for the local copy of the file.

In one embodiment, the third logic is configured to identify the member of the peer-to-peer metadata cache environment that can identify the member of the peer-to-peer metadata cache environment that has the most up-to-date metadata for the local copy of the file using a hash value produced by applying a hash function to a file identifier of the local copy of the file, where the hash function inputs the file identifier and outputs the hash value, the hash value being one of a client identifier, and a value that identifies a client identifier in a repository of client identifiers, and where the client identifier uniquely identifies a member of the peer-to-peer metadata cache environment.

In one embodiment, the apparatus also includes a fifth logic configured to update the member of the peer to peer metadata cache environment that has the most up-to-date metadata with new metadata.

In one embodiment, the apparatus also includes a fifth logic configured to update the member of the peer to peer metadata cache environment that can identify the member of the peer to peer metadata cache environment with the most up-to-date metadata with a new client identifier.

In one embodiment, the apparatus also includes a sixth logic configured to selectively communicate to the server one or more of, metadata associated with the local copy of the file, and the local copy of the file.

In one embodiment, the peer-to-peer metadata cache environment includes an NFS file server and a set of NFS clients.

In one embodiment, a method includes intercepting a metadata request intended for an NFS server, where the metadata request originated from a member of a set of peers participating in peer-to-peer distributed metadata caching, and communicating with a member of the set of peers to satisfy the metadata request from a distributed metadata cache maintained by the set of peers.

In one embodiment, the method may also include satisfying the metadata request by satisfying a request to acquire metadata, and/or satisfying a request to update metadata.

In one embodiment, the method may also include identifying the member of the set of peers to communicate with to satisfy the metadata request based, at least in part, on a file identifier associated with the metadata request.

In one embodiment of the method, identifying the member of the set of peers to communicate with comprises applying a hash function to the file identifier associated with the metadata request to acquire data from which a peer identifier can be acquired.

In one embodiment, an apparatus includes a local memory configured to store a local copy of a file acquired from a file server, a network attached storage configured to store a local copy of metadata associated with the file, and a processor configured to control the apparatus to participate in peer-to-peer communication based distributed metadata caching whereby metadata requests associated with the local copy of the file are satisfied using the peer-to-peer communication based distributed metadata caching.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

DETAILED DESCRIPTION

Figure 1:
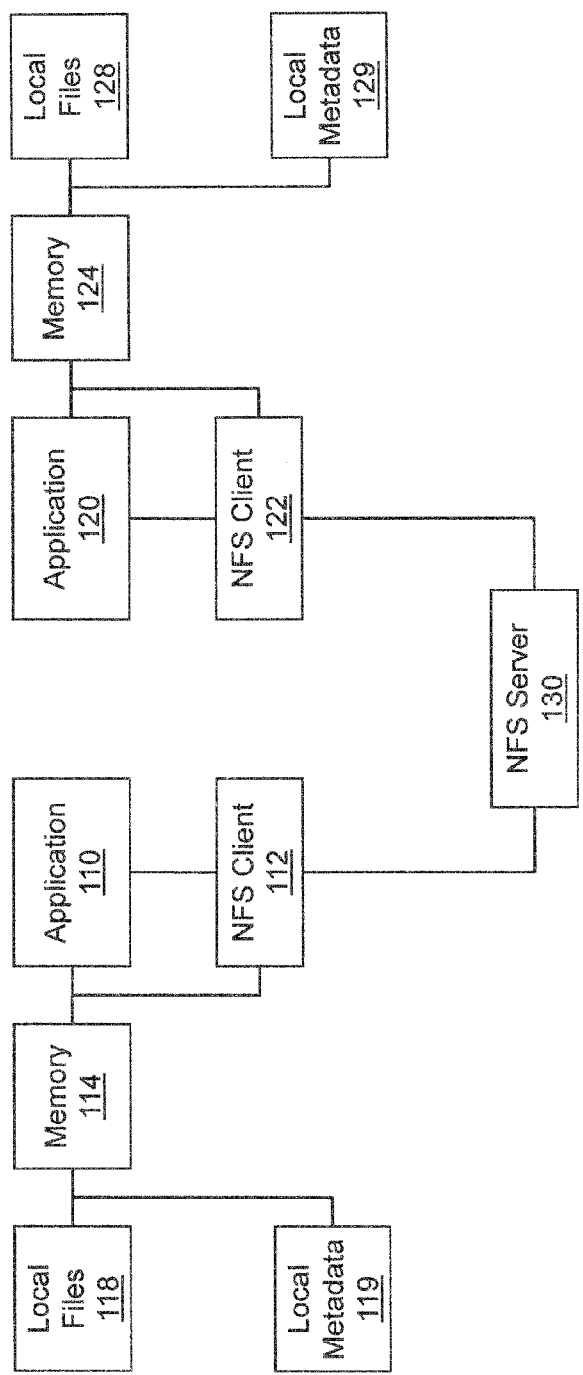
FIG. 1 illustrates a conventional NFS client/server environment.

Described herein are examples of apparatuses, methods, and other embodiments associated with peer-to-peer communication based distributed metadata caching. Examples of apparatuses and methods provide peer-to-peer communication between NFS clients, which facilitates providing distributed metadata caching. The distributed metadata caching eases issues produced by the conventional centralized control and the retire/refresh protocol.

Examples of apparatuses and methods can interact with and/or update an NFS client so that the NFS client no longer automatically communicates with the NFS server concerning every file operation or every file touch that would impact metadata. Instead of automatically going to the NFS server, an NFS client may first examine its own cache and/or communicate with a peer(s) to discover which peer(s), if any, including the NFS client itself, are supposed to have the most up-to-date metadata for a file. If the NFS client has the most up-to-date metadata and is responsible for having the most up-to-date metadata, then there is no need to communicate with other NFS clients or with the NFS server. If the NFS client has the most up-to-date metadata but another NFS client is responsible for having the most up-to-date metadata, then the NFS client may need to cause the other NFS client to be updated.

In one embodiment, at least one NFS client will be responsible for storing up-to-date metadata. In another embodiment, two or more NFS clients will be responsible for storing up-to-date metadata. Thus, metadata may be stored redundantly. Similarly, in one embodiment, at least one NFS client will be responsible for knowing which NFS client, if any, has the most up-to-date metadata for a file. In another embodiment, two or more NFS clients will be responsible for knowing which NFS client, if any, has the most up-to-date metadata for a file. Thus, the metadata caching may also be redundant in storing information about where up-to-date metadata can be found. Conventionally, only the NFS server would know which metadata was up-to-date or only the NFS server would have the up-to-date metadata. Distributing the responsibility for storing up-to-date metadata removes a load from the NFS server. Similarly, distributing the responsibility for knowing which NFS client has the up-to-date metadata removes a significant load from the NFS server. However, if these responsibilities are not properly distributed between an adequate number of NFS clients, then the burdens have only been shifted from an NFS server to an NFS client(s).

Examples of apparatuses and methods may attempt to balance the distribution of responsibility between participating NFS clients. One way to balance distribution of responsibility for storing metadata and/or responsibility for knowing who has up-to-date metadata involves using a hash function. The hash function is designed to produce a good (e.g., uniform, Gaussian) distribution of responsibility for files between participating NFS clients. The hash function may be known to the NFS server and to the participating NFS clients. When an operation that will affect a file or its metadata is performed, the file identifier may be provided to the hash function. The hash function will then return a value that can be used to identify an NFS client that either has the metadata and/or is responsible for knowing who has the metadata. In one embodiment, the value may be used as an index into a repository (e.g., table, array) of NFS client identifying information. In another embodiment, the value may be an NFS client identifier.

For a sufficiently large number of files and with a well-designed hash function, a relatively uniform distribution of responsibility may occur. However, as NFS clients are added or deleted from the set of participating NFS clients, the hash function and/or linkage between hash values and available NFS clients may need to be updated. Therefore, in another embodiment, another way to balance distribution is to assign responsibility based on an understanding of the current distribution and to store the responsibility data in a per file table.

As files are requested, the NFS server or another entity may identify the current responsibility distribution at participating NFS clients and assign responsibility for this file to a selected NFS client. This technique removes the hash function calculation on every file access at an NFS client but introduces a responsibility to perform a distribution action on a per unique file basis.

Using the hash function to produce the client identifier means that no additional memory to store information on a per file or per client basis is required. Using the hash function to produce an index value means that additional storage sufficient to have one entry per NFS client that correlates the identifier to an NFS client is used. When information is stored on a per file basis instead of using the hash function, then each NFS client will store a correlation between a file and an NFS client for files known to the NFS. While this approach may consume more memory, it removes the need to perform the hash function on each file operation.

Figure 6:
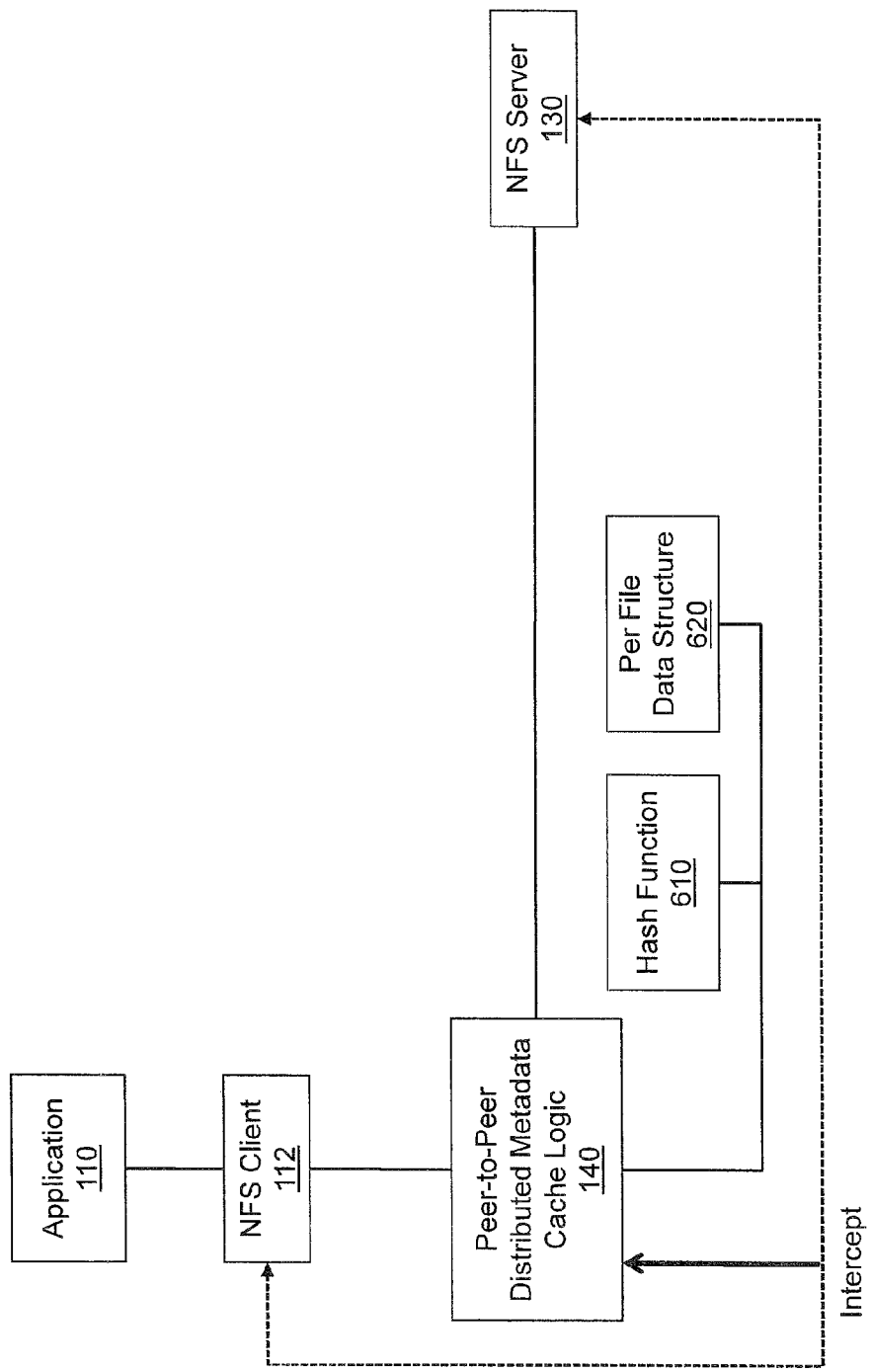
FIG. 6 illustrates a hash function and a per file data structure associated with peer-to-peer communication based distributed metadata caching.

FIG. 6 illustrates both the hash function 610 and the per file data structure 620 that are available to logic 140 in different embodiments. The hash function 610 can input a file handle and output a client identifier. In one example, the hash function 610 inputs a file handle and outputs an index into an array that has been populated with client identifiers. The per file data structure 620 may store a file identifier and a client identifier. When the logic 140 intercepts the metadata request, the hash function 610 or the per file data structure 620 may identify the file associated with the metadata request and then provide information about the peer that can satisfy the metadata request.

Figure 2:
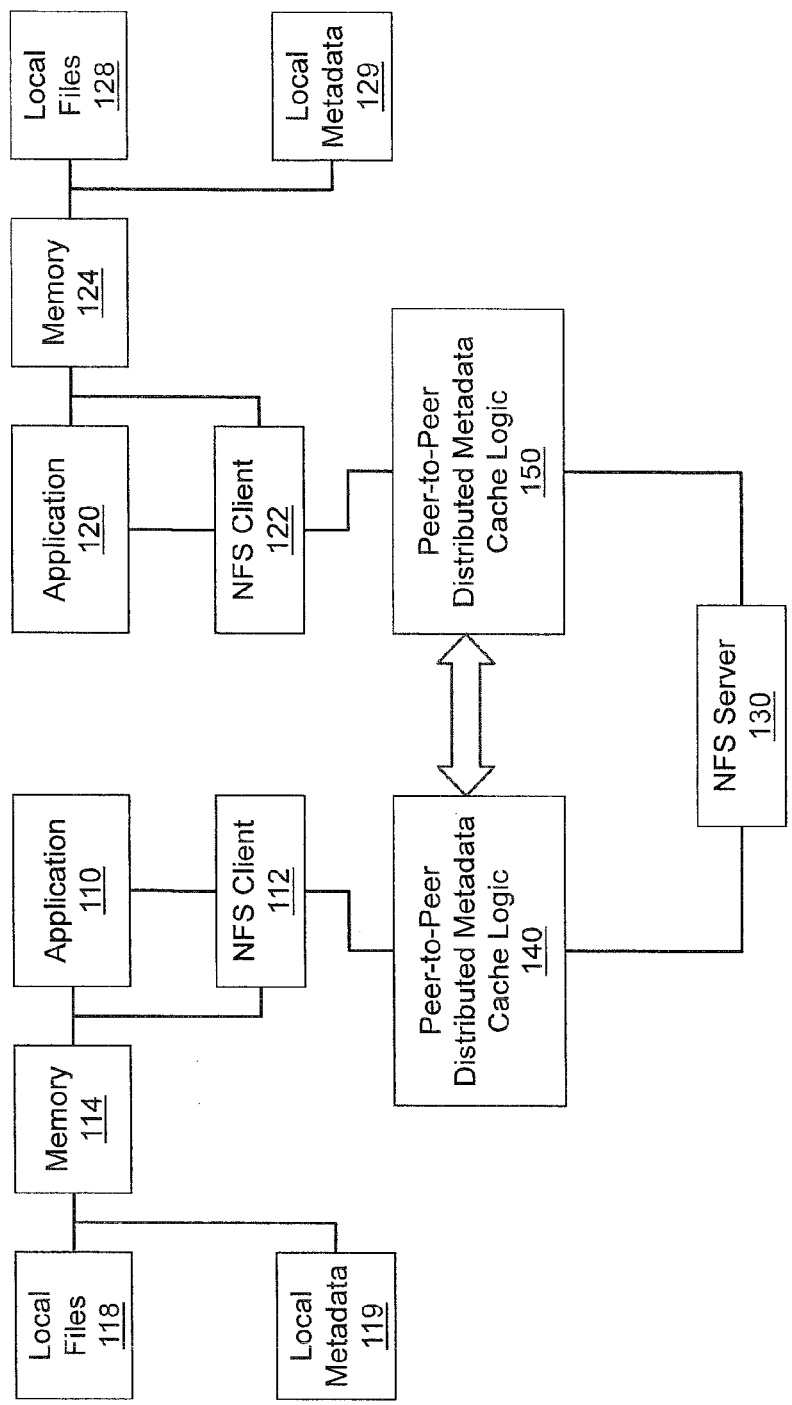
FIG. 2 illustrates a distributed metadata cache environment.

FIG. 2 illustrates a distributed metadata cache environment where NFS clients communicate with each other to handle at least a portion of the metadata burden rather than always communicating with the NFS server 130. In FIG. 2, the NFS client 112 is illustrated interacting with a peer-to-peer distributed metadata cache logic 140 and NFS client 122 is illustrated interacting with a peer-to-peer distributed metadata cache logic 150. In FIG. 1, metadata requests flowed to NFS server 130. In FIG. 2, metadata requests may flow between peer-to-peer distributed metadata cache logic 140 and peer-to-peer distributed metadata cache logic 150.

The peer-to-peer distributed metadata cache logic 140 may take actions including, but not limited to, storing metadata, storing information about where metadata can be found, requesting metadata from another peer instead of from the NFS server 130, requesting information from another peer about where metadata can be found other than on the NFS server 130, causing another logic on another client to update metadata that is stored by that other logic, and causing another logic on another client to update information about where up-to-date metadata can be found.

Figure 3:
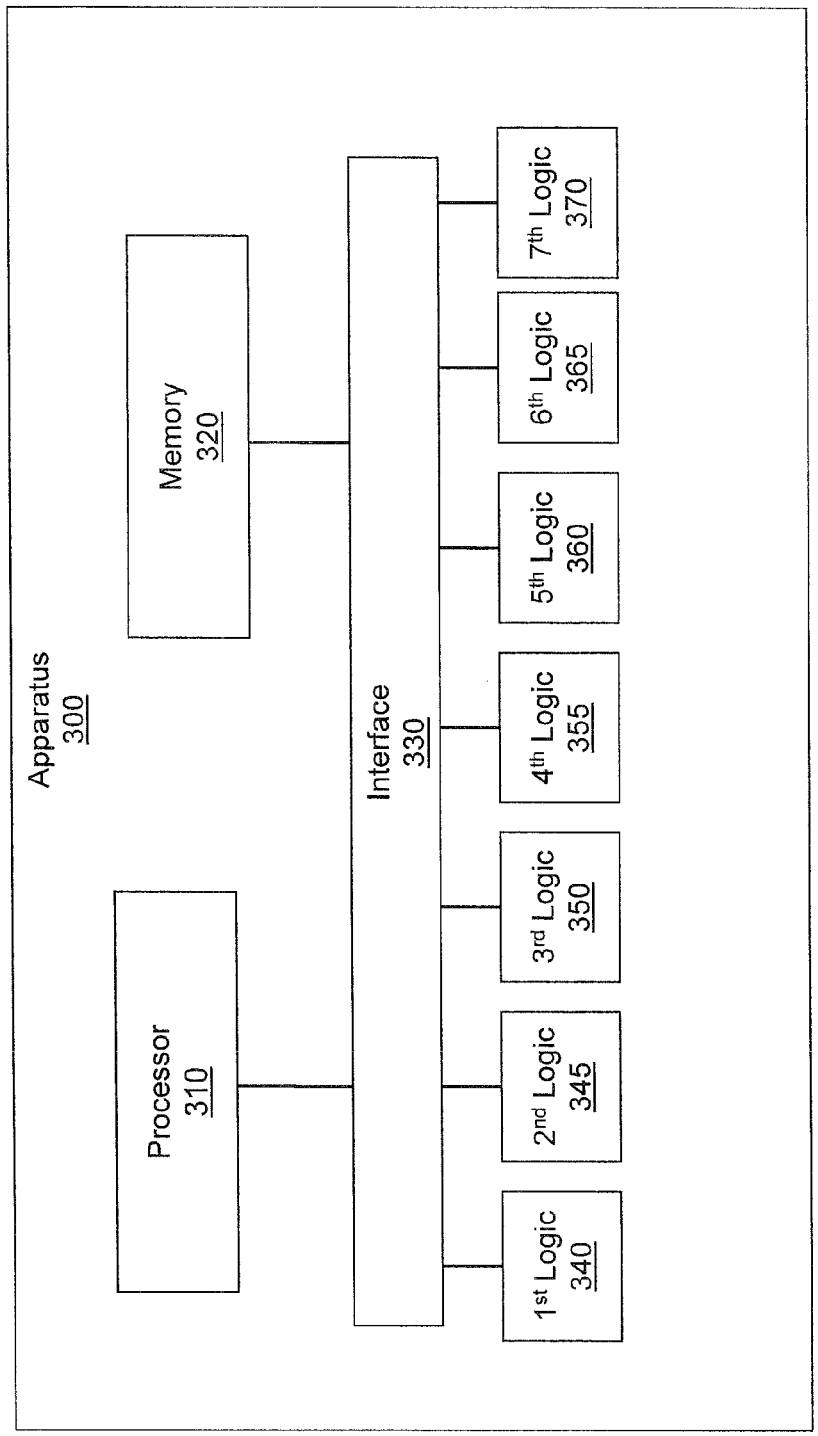
FIG. 3 illustrates an apparatus configured to participate in peer-to-peer communication based distributed metadata caching.

FIG. 3 illustrates an apparatus 300 that is configured to operate in a distributed metadata cache environment and that is configured to participate in peer-to-peer communication based distributed metadata caching. In the distributed metadata caching, members of a set of peers share the burden of storing metadata for files that are copied from a server to a client(s) that is a member of the set of peers. The metadata may be cached on one or more members of the set of peers. Information about where the metadata is cached may also be stored on one or more members of the set of peers. Storing, at a member of the peers, up-to-date metadata and information about where that up-to-date metadata can be found facilitates reducing communications with the NFS server.

Apparatus 300 includes a processor 310, a memory 320, and an interface 330 to connect the processor 310, the memory 320, and a set of logics. The set of logics may include a first logic 340, a second logic 345, a third logic 350, a fourth logic 355, a fifth logic 360, a sixth logic 365, and a seventh logic 370. In different embodiments the logics may be configured to perform different actions associated with supporting or interacting with distributed metadata caching. While seven logics are illustrated, it will be appreciated that a greater and/or lesser number of logics can be configured to perform the actions performed by the seven logics. In one embodiment, the apparatus 300 may be an NFS client that interacts with an NFS server. While an NFS client and NFS server are described, the distributed metadata caching described herein may be employed with other network based file systems.

In one embodiment, first logic 340 is configured to store metadata. The metadata is associated with a local copy of a file that was acquired from a server that is co-operating with a set of clients that are participating in peer-to-peer communication based distributed metadata caching. The set of clients may be referred to as a set of peers. The metadata may be stored in memory 320, on a solid state device (SSD), and/or in other locations known to and available to apparatus 300. The metadata may be stored by apparatus 300 and may also be redundantly stored by another apparatus in the set of clients. In one embodiment, the local copy of the file may be stored in a first location (e.g., memory 320) while the metadata may be stored in a second location (e.g., SSD). More generally, the first logic 340 may be configured to store metadata associated with a local copy of a file, the second logic 345 may be configured to store data that facilitates storing the most up-to-date metadata for the local copy of the file in the peer-to-peer metadata cache environment, and the third logic 350 may be configured to store data that facilitates locating, in the peer-to-peer metadata cache environment, the most up-to-date metadata for the local copy of the file.

The second logic 345 may be configured to store data that identifies a member of the set of clients that is responsible for knowing which peer has the most up-to-date metadata for the local copy of the file. The second logic 345 may also be configured to store data that identifies a member of the set of clients that is responsible for storing a copy of the most up-to-date metadata for the local copy of the file. Thus, second logic 345 may store information about where the most up-to-date metadata is located, and/or may store information about which client knows where the most up-to-date metadata is located. Storing this information facilitates not having to go all the way back to the NFS server when a metadata request is made. Recall that communications with the NFS server created a bottleneck in conventional systems.

The third logic 350 may be configured to identify a member of the set of clients that has the most up-to-date metadata for the local copy of the file. The identification may be made from the data stored by second logic 345. The third logic 350 may also be configured to identify a member of the set of clients that can identify the member of the set of clients that has the most up-to-date metadata for the local copy of the file. Once again the identification may be made from data stored by second logic 345. The third logic 350 may be able to identify clients in different ways including, but not limited to, applying a hash function to a file identifier associated with the file to which the metadata pertains, and acquiring client identifiers from a repository (e.g., array, table, file) of client identifiers.

The fourth logic 355 may be configured to acquire the most up-to-date metadata for the local copy of the file. The fourth logic 355 may acquire the up-to-date metadata using the identifications performed by third logic 350. In one example, when the apparatus 300 is itself responsible for having the most up-to-date metadata, then the fourth logic 355 may acquire the up-to-date metadata from apparatus 300. In another example, when a different client is responsible for having the most up-to-date metadata, then the fourth logic 355 may need to request that metadata from a member of the set of clients. However, the fourth logic 355 may not be able to request the information directly and may first have to find out who is responsible for having the most up-to-date metadata.

In one embodiment, the third logic 350 is configured to identify the member of the set of clients that has the most up-to-date metadata for the local copy of the file as a function of a hash value produced by applying a hash function to a file identifier of the local copy of the file. The hash value may be, for example, a client identifier or may be used to locate a client identifier in a repository of client identifiers. The repository may store one or more client identifiers per entry and may be indexed using the hash value. In one example, if the hash value leads to an empty entry where no client identifier is found, then apparatus 300 may go back to the NFS server for the desired information. While a hash function is described, it is to be appreciated that other mathematical and algorithmic approaches may be employed to identify a client from a file identifier.

In another embodiment, the third logic 350 is configured to identify the member of the set of clients that has the most up-to-date metadata for the local copy of the file by accessing a per file data structure that stores information correlating files to clients. In one example, the per file data structure may be populated as members of the set of clients take responsibility for files. In another example, the per file data structure may be populated by the NFS server. The per file data structure may be manipulated to facilitate load balancing.

In one embodiment, the third logic 350 is configured to identify the member of the set of clients that can identify the member of the set of clients that has the most up-to-date metadata for the local copy of the file as a function of a hash value produced by applying a hash function to a file identifier of the local copy of the file. Once again, the hash value may be a client identifier or may be used to locate a client identifier in a repository of client identifiers.

FIG. 6 illustrates a hash function 610 and a per file data structure 620 interacting with a peer-to-peer distributed metadata cache logic 140. Hash function 610 and per file data structure could be similarly employed by third logic 350. The third logic 350 may be able to identify clients in different ways including, but not limited to, applying a hash function to a file identifier associated with the file to which the metadata pertains, acquiring client identifiers from a repository (e.g., array, table, file) of client identifiers, and accessing a per file data structure that stores information correlating files to clients. The per file data structure may store file identifiers and client identifiers.

In one embodiment, the fifth logic 360 is configured to update the member of the set of clients that has the most up-to-date metadata with new metadata. The fifth logic 360 may provide the metadata to a member of the set of clients after determining that apparatus 300 now has the most up-to-date metadata but that a different member of the set of clients is supposed to either have or know who has the most up-to-date metadata. Additionally and/or alternatively, the fifth logic 360 may be configured to update the member of the set of clients that can identify the member of the set of clients with the most up-to-date metadata with a new client identifier sufficient to identify apparatus 300.

In one embodiment, the sixth logic 365 may be configured to selectively communicate with the server. The sixth logic 365 may be configured to communicate metadata associated with the local copy of the file. This may be employed in cases where response time on the peer-to-peer network is below a desired threshold. This may also be employed as a backup or safety mechanism where after a certain period of time has expired it is appropriate to inform the NFS server of what has happened with the distributed metadata caching. Also, since the ultimate responsibility for having up-to-date metadata and an up-to-date file may reside with the NFS server, the sixth logic 365 may also communicate the local copy of the file to the NFS server.

In one embodiment, seventh logic 370 is configured to selectively communicate with a member of the set of clients instead of with the server in response to intercepting an NFS GetAttr call that was intended for the server. An NFS GetAttr call is a function that requests the file attributes of a file identified by a previously obtained file handle. Caching metadata locally allows intercepting the NFS GetAttr call and providing the file attributes without reaching all the way back to the NFS server. The seventh logic 370 can also be configured to selectively communicate with a member of the set of set of clients instead of with the server in response to intercepting an NFS SetAttr call that was intended for the server. An NFS SetAttr call is a function that updates the file attributes of a file identified by a previously obtained file handle. Once again, caching metadata locally allows intercepting the NFS SetAttr call and updating the file attributes without reaching all the way through to the NFS server. Thus, in one embodiment, seventh logic 370 may be physically and/or logically inserted in between an NFS client and an NFS server. This facilitates retrofitting existing configurations with the distributed metadata caching described herein.

Figure 4:
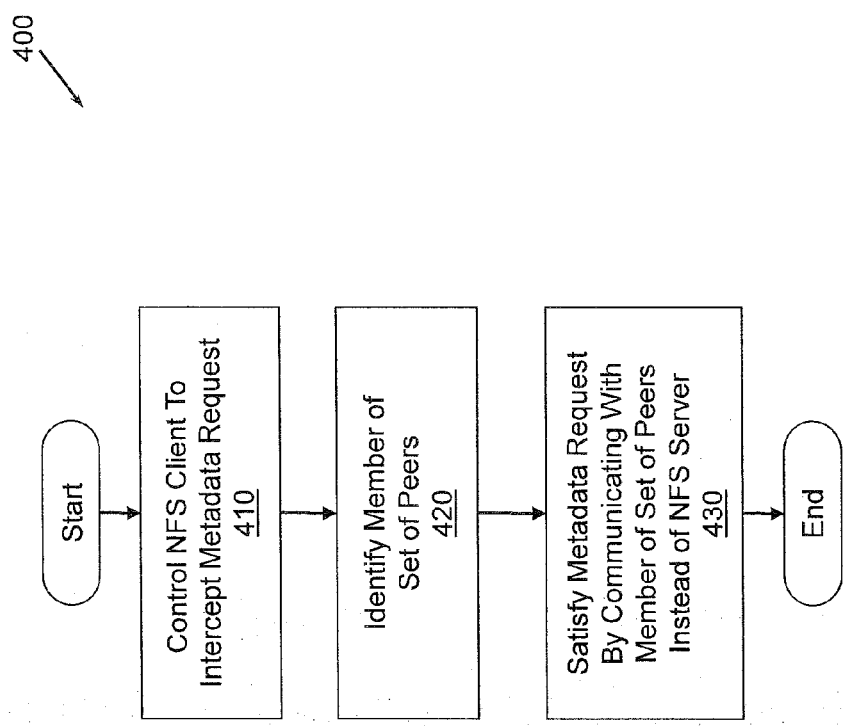
FIG. 4 illustrates a method associated with peer-to-peer communication based distributed metadata caching.

FIG. 4 illustrates a method 400 that is associated with peer-to-peer communication based distributed metadata caching. At 410, method 400 includes controlling an NFS client that is participating with a set of peers in peer-to-peer distributed metadata caching to intercept a metadata request intended for an NFS server. The metadata request may be asking for up-to-date metadata or may be providing information about updated metadata.

At 420, method 400 also includes identifying a member of the set of peers to communicate with to satisfy the metadata request. The member may be identified based, at least in part, on a file identifier associated with the metadata request. In one embodiment, identifying the member of the set of peers to communicate with involves applying a hash function to the file identifier associated with the metadata request to acquire data from which a peer identifier can be acquired. In another embodiment, identifying the member of the set of peers to communicate with involves consulting a per file data structure that stores information correlating files and clients responsible for those files.

At 430, method 400 also includes controlling the NFS client to satisfy the metadata request from a distributed metadata cache maintained by the set of peers. The metadata request is not sent to the NFS server but instead is satisfied by communicating with a member of the set of peers. In one embodiment, satisfying the metadata request includes satisfying a request to acquire metadata. Additionally and/or alternatively, satisfying the metadata request may include satisfying a request to update metadata.

In one embodiment, method 400 may also include controlling the NFS client to store current metadata for a local copy of a file stored at a different member of the set of peers. This would be the case when the apparatus running method 400 was responsible for maintaining the up-to-date metadata for the file. Method 400 may also include controlling the NFS client to store information sufficient to identify a member of the set of peers that has current metadata for a local copy of a file stored at a different member of the set of peers. This may be the case when the apparatus running method 400 has the most up-to-date metadata and a different apparatus is responsible for knowing which apparatus has the most up-to-date metadata.

Figure 5:
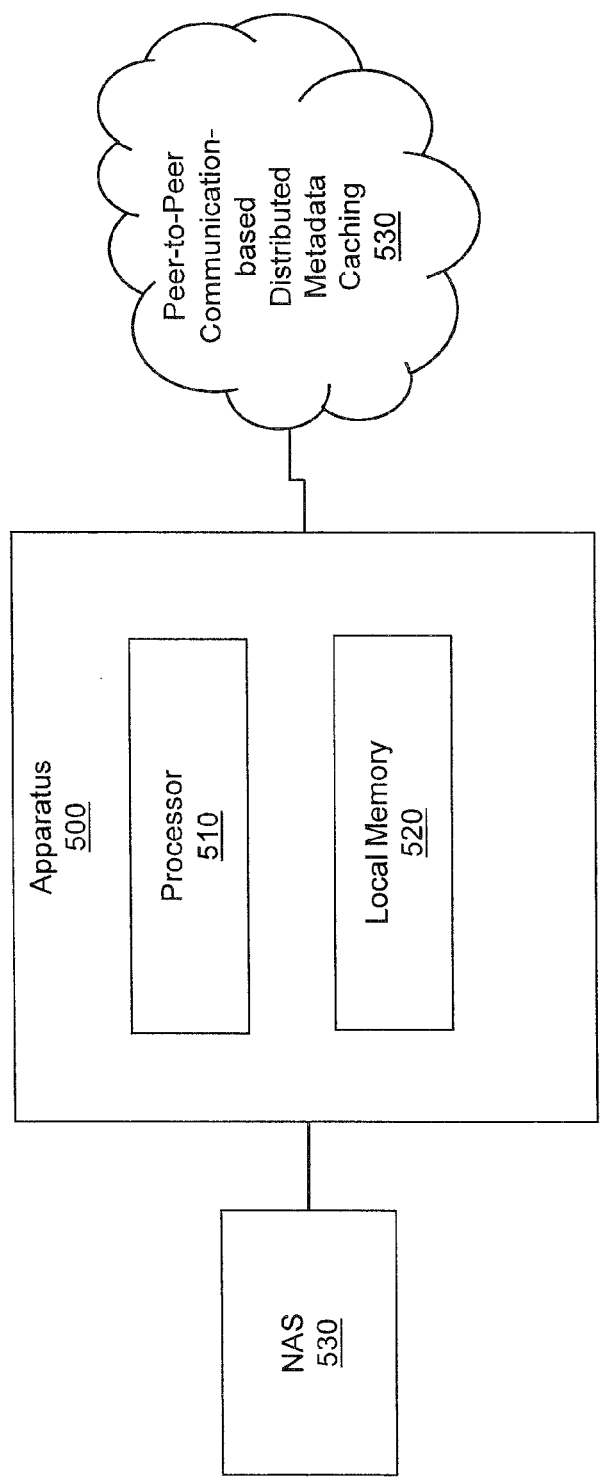
FIG. 5 illustrates an apparatus configured to participate in peer-to-peer communication based distributed metadata caching.

FIG. 5 illustrates an apparatus 500 that is configured to participate in peer-to-peer communication based distributed metadata caching 530. Apparatus 500 includes a processor 510 that is configured to control the apparatus 500 to participate in peer-to-peer communication based distributed metadata caching 530. The distributed metadata caching involves handling metadata requests associated with the local copy of the file using the peer-to-peer communication based distributed metadata caching 530 instead of automatically going to a server for metadata information.

Apparatus 500 also includes a local memory 520 that is configured to store a local copy of a file acquired from a file server. Apparatus 500 also includes a network attached storage (NAS) 530 that is configured to store a local copy of metadata associated with the file. While the local memory 520 is described storing the local copy of the file, it is to be appreciated that the local copy could be stored in other storage available to apparatus 500. Similarly, while the NAS 530 is described storing the metadata, it is to be appreciated that the metadata could be stored in other storage available to apparatus 500.

In one embodiment, the processor 510 is configured to store current metadata for the local copy of the file. The processor 510 may store the current metadata in the local memory 520 and/or in the NAS 530. The processor 510 may also be configured to store current metadata for a local copy of a different file stored at a different apparatus that is participating in the peer-to-peer communication based distributed metadata caching 530. Once again the processor 510 may store the current metadata in the local memory 520 and/or in the NAS 530. The processor 520 may also be configured to store information sufficient to identify an apparatus that is participating in the peer-to-peer communication based distributed metadata caching 530 that has current metadata for the local copy of the file. The processor 510 may store the information in the local memory 520 and/or in the NAS 530. The processor 520 may also be configured to store information sufficient to identify an apparatus that has current metadata for a local copy of a different file stored at a different apparatus that is participating in the peer-to-peer communication based distributed metadata caching 530. Once again, the processor 510 may store the information in the local memory 520 and/or in the NAS 530.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Logic", as used herein, includes but is not limited to hardware, firmware, instructions stored on a non-transitory medium or in execution on a machine, and/or combinations of each to perform a function(s) or an action(s), and/or to cause a function or action from another logic, method, and/or system. Logic may include a software controlled microprocessor, a discrete logic (e.g., ASIC), an analog circuit, a digital circuit, a programmed logic device, a memory device containing instructions, and so on. Logic may include one or more gates, combinations of gates, or other circuit components. Where multiple logics are described, it may be possible to incorporate the multiple logics into one physical logic. Similarly, where a single logic is described, it may be possible to distribute that single logic between multiple physical logics. One or more of the components and functions described herein may be implemented using one or more of the logic elements.

While for purposes of simplicity of explanation, illustrated methodologies are shown and described as a series of blocks. The methodologies are not limited by the order of the blocks as some blocks can occur in different orders and/or concurrently with other blocks from that shown and described. Moreover, less than all the illustrated blocks may be used to implement an example methodology. Blocks may be combined or separated into multiple components. Furthermore, additional and/or alternative methodologies can employ additional, not illustrated blocks.

To the extent that the term "includes" or "including" is employed in the detailed description or the claims, it is intended to be inclusive in a manner similar to the term "comprising" as that term is interpreted when employed as a transitional word in a claim.

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Therefore, the disclosure is not limited to the specific details, the representative apparatus, and illustrative examples shown and described. Thus, this application is intended to embrace alterations, modifications, and variations that fall within the scope of the appended claims.

What is claimed is:

1. A method, comprising:
   intercepting a metadata request, in a computer, intended for a network file system (NFS) server, wherein the metadata request originated from a member of a set of peers participating in peer-to-peer distributed metadata caching;
   controlling the computer to identify a member of the set of peers to communicate with to satisfy the metadata request by accessing a per file data structure that stores information correlating files to one or more members of the set of peers, wherein the per file data structure stores a file identifier and a related client identifier, and wherein the related client identifier uniquely identifies the member of the set of peers that has a most up-to-date metadata for a local copy of a file specified by the metadata request; and
   communicating with the member of the set of peers to satisfy the metadata request from a distributed metadata cache maintained by the set of peers.

2. The method of claim 1, wherein communicating with the member of the set of peers to satisfy the metadata request comprises one or more of, satisfying a request to acquire metadata, and satisfying a request to update metadata.

3. The method of claim 1, comprising identifying the member of the set of peers to communicate with to satisfy the metadata request based, at least in part, on a file identifier associated with the metadata request.

4. The method of claim 3, wherein identifying the member of the set of peers to communicate with comprises applying a hash function to the file identifier associated with the metadata request to acquire data from which a peer identifier can be acquired.

5. The method of claim 1, comprising controlling the computer to store one or more of, current metadata for a local copy of a file stored at a different member of the set of peers, and information to identify a member of the set of peers that has current metadata for a local copy of a file stored at a different member of the set of peers.

6. A non-transitory computer-readable medium storing computer executable instructions that when executed by a computer cause the computer to perform a method, the method comprising:
   intercepting a metadata request, in the computer, intended for a network file system (NFS) server, wherein the metadata request originated from a member of a set of peers participating in peer-to-peer distributed metadata caching;
   controlling the computer to identify a member of the set of peers to communicate with to satisfy the metadata request by accessing a per file data structure that stores information correlating files to one or more members of the set of peers, wherein the per file data structure stores a file identifier and a related client identifier, and wherein the related client identifier uniquely identifies the member of the set of peers that has a most up-to-date metadata for a local copy of a file specified by the metadata request; and
   communicating with the member of the set of peers to satisfy the metadata request from a distributed metadata cache maintained by the set of peers.

7. The non-transitory computer-readable medium of claim 6, wherein communicating with the member of the set of peers to satisfy the metadata request comprises one or more of, satisfying a request to acquire metadata, and satisfying a request to update metadata.

8. The non-transitory computer-readable medium of claim 6, comprising identifying the member of the set of peers to communicate with to satisfy the metadata request based, at least in part, on a file identifier associated with the metadata request.

9. The non-transitory computer-readable medium of claim 8, wherein identifying the member of the set of peers to communicate with comprises applying a hash function to the file identifier associated with the metadata request to acquire data from which a peer identifier can be acquired.

10. The non-transitory computer-readable medium of claim 6, comprising controlling the computer to store one or more of, current metadata for a local copy of a file stored at a different member of the set of peers, and information to identify a member of the set of peers that has current metadata for a local copy of a file stored at a different member of the set of peers.

11. The system of claim 6, wherein communicating with the member of the set of peers to satisfy the metadata request comprises one or more of, satisfying a request to acquire metadata, and satisfying a request to update metadata.

12. The system of claim 6, comprising identifying the member of the set of peers to communicate with to satisfy the metadata request based, at least in part, on a file identifier associated with the metadata request.

13. The system of claim 12, wherein identifying the member of the set of peers to communicate with comprises applying a hash function to the file identifier associated with the metadata request to acquire data from which a peer identifier can be acquired.

14. The system of claim 6, comprising controlling the computer to store one or more of, current metadata for a local copy of a file stored at a different member of the set of peers, and information to identify a member of the set of peers that has current metadata for a local copy of a file stored at a different member of the set of peers.

15. A system, comprising:
   an intercept logic configured to intercept a metadata request, in a computer, intended for a network file system (NFS) server, wherein the metadata request originated from a member of a set of peers participating in peer-to-peer distributed metadata caching; and
   a communication logic configured to:
      control the computer to identify a member of the set of peers to communicate with to satisfy the metadata request by accessing a per file data structure that stores information correlating files to one or more members of the set of peers, wherein the per file data structure stores a file identifier and a related client identifier, and wherein the related client identifier uniquely identifies the member of the set of peers that has a most up-to-date metadata for a local copy of a file specified by the metadata request; and
      communicate with the member of the set of peers to satisfy the metadata request from a distributed metadata cache maintained by the set of peers.

* * * * *